United States Patent
Greiving et al.

(10) Patent No.: US 6,696,531 B1
(45) Date of Patent: Feb. 24, 2004

(54) PROCESS FOR PREPARING A POLYMER FROM 3,4-EPOXY-1-BUTENE

(75) Inventors: Helmut Greiving, Wuppertal (DE); Peter J. Miller, Gray, TN (US)

(73) Assignee: Bayer Polymers LLC, Pittsburgh, PA (US)

( * ) Notice: Subject to any disclaimer, the term of this patent is extended or adjusted under 35 U.S.C. 154(b) by 0 days.

(21) Appl. No.: 10/368,194

(22) Filed: Feb. 18, 2003

(51) Int. Cl.$^7$ .................................................. C08F 4/06
(52) U.S. Cl. ................. 526/113; 526/348.6; 526/307.5; 526/348; 502/156; 502/154
(58) Field of Search .......................... 526/348.6, 307.5, 526/348; 502/156, 154

(56) References Cited

U.S. PATENT DOCUMENTS

| | | | |
|---|---|---|---|
| 2,680,109 A | 7/1954 | Stevens et al. ............ 260/78.3 |
| 3,031,439 A | 4/1962 | Bailey, Jr. .................. 260/88.3 |
| 3,417,064 A | 12/1968 | Bailey, Jr. .................. 260/79.5 |
| 3,755,197 A | * 8/1973 | Hsieh ........................ 252/431 |
| 5,189,199 A | 2/1993 | Godleski ..................... 560/93 |
| 5,393,867 A | 2/1995 | Matayabas, Jr. et al. .... 528/412 |
| 5,466,759 A | 11/1995 | Matayabas, Jr. et al. .... 525/403 |
| 5,545,601 A | * 8/1996 | Le-Khac ..................... 502/156 |
| 5,608,117 A | * 3/1997 | Matayabas, Jr. et al. .... 568/616 |

FOREIGN PATENT DOCUMENTS

| | | |
|---|---|---|
| GB | 869112 | 5/1961 |
| JP | 09157349 | * 6/1997 |

* cited by examiner

Primary Examiner—Ling-Siu Choi
(74) Attorney, Agent, or Firm—Joseph C. Gil; Gary F. Matz

(57) ABSTRACT

The invention relates to a process for preparing a polymer by polymerizing a component containing 3,4-epoxy-1-butene in the presence of a double metal cyanide (DMC) catalyst and a hydroxy-functional starter and it also relates to the obtained polymers.

12 Claims, No Drawings

PROCESS FOR PREPARING A POLYMER FROM 3,4-EPOXY-1-BUTENE

The invention relates to a process for preparing a polymer by polymerizing a component containing 3,4-epoxy-1-butene in the presence of a double metal cyanide (DMC) catalyst and a hydroxy-functional starter.

BACKGROUND OF THE INVENTION

The polymerization and copolymerization of 3,4-epoxy-1-butene (EpB) is known. For example, U.S. Pat. No. 2,680,109 discloses the polymerization of unsaturated 1,2-epoxides, including 3,4-epoxy-1-butene, using as catalyst stannic chloride containing a small amount of water. British Patent 869,112 and U.S. Pat. Nos. 3,031,439 and 3,417,064 disclose the copolymerization of 3,4-epoxy-1-butene with ethylene oxide and propylene oxide, using as catalyst strontium carbonate containing a small amount of water.

U.S. Pat. No. 5,393,867 discloses polyether compounds obtained by the reaction or polymerization of 3,4-epoxy-1-butene in the presence of a palladium(O) catalyst and a nucleophilic initiator compound.

U.S. Pat. No. 5,466,759 describes polymers made by polymerizing 3,4-epoxy-1-butene in the presence of a catalytic amount of certain acidic compounds and a hydroxyl initiator compound. The acidic compounds may be selected from strong acids such as sulfuric acid; perchloric acid; fluoroboric acid; strongly acidic ion exchange resins, e.g., Amberlyst resins; and fluorosulfonic acids such as perfluoroalkanesulfonic acids containing up to about 6 carbon atoms, e.g., trifluoromethanesulfonic acid and fluorosulfonic acid and perfluorosulfonic acid polymers, e.g., Nafion resins, e.g., Nafion NR-50 acidic resin.

U.S. Pat. No. 5,466,759 also describes polymerizing 3,4-epoxy1-butene in the presence of a catalytic amount of a palladium(O) complex and a hydroxyl initiator compound. The palladium catalyst comprises palladium(O) in complex association with about 2 to 4 ligands, such as the catalysts disclosed in WO 89/02883. Suitable ligands include trihydrocarbyl phosphines and trihydrocarbylarsines, e.g., triphenylphosphine, tributylphosphine, trimethylphosphine, 1,2-bis(diphenylphosphino)ethane, triphenylarsine, tributylarsine, the trisodium salt of tri(m-sulfophenyl)phosphine, and the like.

U.S. Pat. No. 5,466,759 also describes polymerizing 3,4-epoxy-1-butene in the presence of a catalyst system comprising an onium iodide compound such as an ammonium or phosphonium iodide and an organotin compound such as a trihydrocarbyltin iodide. The onium iodide component of the catalyst system may be selected from a variety of tetra(hydrocarbyl)ammonium iodides and tetra(hydrocarbyl)phosphonium iodides, preferably having a total carbon atom content of about 16 to 72 carbon atoms. The teachings of this reference are incorporated in this application by reference.

The experience with palladium catalyst in the course of this work showed that the most effective catalyst was tetrakistriphenylphosphine palladium(0) whereas three supported palladium catalysts, 5% palladium on carbon, 10% palladium on alumina and 5% palladium on barium sulfate showed no polymerization even under more rigorous conditions such as high monomer concentration and reflux temperatures.

A variety of hydroxy functional starters were found to be suitable for initiation of EpB polymerization using the palladium catalyst. For the most part, difunctional initiators were used for the catalyst development work. However, when studies indicated monofunctional initiators were explored and, according to customer demand, trifunctional initiators were also utilized. Primary and secondary alcohols were equally suitable polymerization form 1- and 2-butanol yielded near-identical polyethers.

The Pd(0) catalyst is capable of producing expoxybutene homopolymers. The synthesis was generally conducted in 50% methylene chloride at −20 to +20° C. The low temperature and high solvent concentration were both necessary to accommodate the high exothermicity of the reaction. The degree of 1,2-versus 1,4-addition was found to be reaction temperature dependent. For example, at 20° C., the polymer contained up to 80% pendant double bonds while at 0° C. the value dropped to 4%. Due to this mixture of structural isomers, the polymers contained both primary and secondary terminal hydroxyl groups. The polymers were thermally stable up to ~300° C. and viscosities were generally 250–600 cP depending on molecular weight and functionality. Using BO as the second monomer, it was determined that the palladium catalyst will not copolymerize expoxybutene with other epoxides. It was an object of the present invention to provide an easy process to produce EpB homo- and copolymers and a good property spectrum for applications in the field of polyurethanes.

SUMMARY OF THE INVENTION

The invention relates to a process for preparing a polymer by polymerizing a component I. containing 3,4-epoxy-1-butene in the presence of II. a double metal cyanide (DMC) catalyst and III. a hydroxy-functional starter.

The invention also relates to a polymer obtained by that process.

The invention also relates to a process of forming a polyurethane bond in a reaction mixture comprising adding that polymer to the reaction mixture.

DETAILED DESCRIPTION OF THE INVENTION

The component I. can also contain other monomers that will copolymerize with EpB in the presence of a DMC compound in the process of the invention to make other types of polymers. Any of the copolymers known in the art made using conventional DMC catalysts can be made with the catalysts of the invention. For example, epoxides copolymerize with oxetanes (as described in U.S. Pat. Nos. 3,278,457 and 3,404,109) to give polyethers, or with anhydrides (U.S. Pat. Nos. 5,145,883 and 3,538,043) to give polyester or polyetherester polyols. The preparation of polyether, polyester, and polyetherester polyols using double metal cyanide catalysts is described, for example, in U.S. Pat. Nos. 5,223,583; 5,145,883; 4,472,560; 3,941,849; 3,900,518; 3,538,043; 3,404,109; 3,278,458 and 3,278,457, and in J. L. Schuchardt and S. D. Harper, SPI Proceedings, 32nd Annual Polyurethane Tech./Market. Conf. (1989) 360. The teachings of these references related to polyol synthesis using DMC catalysts are incorporated herein by reference in their entirety.

Preferred monomers are ethylene oxide, propylene oxide and mixtures thereof.

Double metal cyanide (DMC) complexes are well-known catalysts for epoxide polymerization. These active catalysts give polyether polyols that have low unsaturation compared with similar polyols made using basic (KOH) catalysis. The catalysts can be used to make many polymer products, including polyether, polyester, and polyetherester polyols. The polyols can be used in polyurethane coatings, elastomers, sealants, foams, and adhesives.

DMC catalysts are usually made by reacting aqueous solutions of metal salts and metal cyanide salts to form a precipitate of the DMC compound. A low molecular weight complexing agent, typically an ether or an alcohol is included in the catalyst preparation. The complexing agent is needed for favorable catalyst activity. Preparation of typical DMC catalysts is described, for example, in U.S. Pat. Nos. 3,427,256; 3,829,505 and 5,158,922.

Highly active DMC catalysts that include, in addition to a low molecular weight organic complexing agent, from about 5 to about 80 wt. % of a polyether having a molecular weight greater than about 500 are described in U.S. Pat. No. 5,482,908, hereby incorporated in this application by reference. Excellent results are obtained when the polyether component of the DMC catalyst is a polyoxypropylene polyol. Compared with earlier DMC catalysts, the polyether-containing DMC catalysts have excellent activity and give polyether polyols with very low unsaturation. In addition, polyether-containing DMC catalysts such as those described in U.S. Pat. No. 5,482,908 are easier to remove from the polyol products following epoxide polymerization.

The polyether-containing DMC catalysts are valuable because they give polyether polyols with low unsaturation, and they are active enough to allow their use at very low concentrations, often low enough to overcome any need to remove the catalyst from the polyol.

U.S. Pat. No. 5,545,601 to Le-Khac describes a solid double metal cyanide (DMC) catalyst useful for epoxide polymerizations. The catalyst comprises a DMC compound, an organic complexing agent, and from about 5 to about 80 wt. % of a polyether polyol. Some or all of the hydroxyl groups of the polyether polyol are tertiary hydroxyl groups. The invention also includes a method for making the catalysts, and a process for making epoxide polymers using the catalysts.

U.S. Pat. No. 5,482,908 to Le-Khac describes a solid double metal cyanide (DMC) catalyst useful for epoxide polymerization, comprising: (a) a zinc hexacyanocobaltate compound; (b) tert-butyl alcohol; and (c) from about 10 to about 70 wt. %, based on the amount of catalyst, of a polyether polyol having a number average molecular weight within the range of about 1000 to about 5000.

U.S. Pat. No. 5,470,813 to Le-Khac decribes a method for preparing an epoxide polymer. The method comprises polymerizing an epoxide in the presence of a catalyst which comprises at least about 70 wt. % of a substantially amorphous DMC complex.

Double metal cyanide compounds useful in the invention are the reaction products of a water-soluble metal salt and a water-soluble metal cyanide salt. The water-soluble metal salt preferably has the general formula M(X)n in which M is selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). More preferably, M is selected from the group consisting of Zn(II), Fe(II), Co(II), and Ni(II). In the formula, X is preferably an anion selected from the group consisting of halide, hydroxide, sulfate, carbonate, cyanide, oxalate, thiocyanate, isocyanate, isothiocyanate, carboxylate, and nitrate. The value of n is from 1 to 3 and satisfies the valency state of M. Examples of suitable metal salts include, but are not limited to, zinc chloride, zinc bromide, zinc acetate, zinc acetonylacetate, zinc benzoate, zinc nitrate, iron(II) sulfate, iron(II) bromide, cobalt(II) chloride, cobalt(II) thiocyanate, nickel(II) formate, nickel (II) nitrate, and the like, and mixtures thereof.

The water-soluble metal cyanide; salts used to make the double metal cyanide compounds useful in the invention preferably have the general formula (Y)a M'(CN)b (A)c in which M' is selected from the group consisting of Fe(II), Fe(III), Co(II), Co(III), Cr(II), Or(III), Mn(II), Mn(III), Ir(III), Ni(II), Rh(III), Ru(II), V(IV), and V(V). More preferably, M' is selected from the group consisting of Co(II), Co(III), Fe(II), Fe(III), Cr(III), Ir(III), and Ni(II). The water-soluble metal cyanide salt can contain one or more of these metals. In the formula, Y is an alkali metal ion or alkaline earth metal ion. A is an anion selected from the group consisting of halide, hydroxide, sulfate, carbonate, cyanide, oxalate, thiocyanate, isocyanate, isothiocyanate, carboxylate, and nitrate. Both a and b are integers greater than or equal to 1; the sum of the charges of a, b, and c balances the charge of M'. Suitable water-soluble metal cyanide salts include, but are not limited to, potassium hexacyanocobaltate(II), potassium hexacyanoferrate(II), potassium hexacyanoferrate(III), calcium hexacyanocobaltate(III), lithium hexacyanoiridate(III), and the like.

Examples of double metal cyanide compounds that can be used in the invention include, for example, zinc hexacyanocobaltate(III), zinc hexacyanoferrate(III), zinc hexacyanoferrate(II), nickel(II) hexacyanoferrate(II), cobalt (II) hexacyanocobaltate(III), and the like. Further examples of suitable double metal cyanide compounds are listed in U.S. Pat. No. 5,158,922, the teachings of which are incorporated herein by reference.

The catalyst compositions useful in the invention are prepared in the presence of a complexing agent. Examples of complexing agents are those known in the art, for example, as described in U.S. Pat. No. 5,158,922. The complexing agent is added either during preparation or immediately following precipitation of the catalyst. Usually, an excess amount of the complexing agent is used. Preferred complexing agents are water-soluble heteroatom-containing organic compounds that can complex with the double metal cyanide compound. Suitable complexing agents include, but are not limited to, alcohols, aldehydes, ketones, ethers, esters, amides, ureas, nitriles, sulfides, and mixtures thereof. Preferred complexing agents are water-soluble aliphatic alcohols selected from the group consisting of ethanol, isopropyl alcohol, n-butyl alcohol, isobutyl alcohol, sec-butyl alcohol, and tert-butyl alcohol.

The conventional method of preparing DMC compounds useful for epoxide polymerization is described in many references, including U.S. Pat. Nos. 5,158,922; 4,843,054; 4,477,589; 3,427,335; 3,427,334; 3,427,256; 3,278,457 and 3,941,849. The teachings of these references related to conventional catalyst preparation and suitable DMC compounds are incorporated herein by reference in their entirety.

Double metal cyanide (DMC) complexes are highly active catalysts for preparing polyether polyols by epoxide polymerization. The catalysts enable the preparation of polyether polyols having narrow molecular weight distributions and very low unsaturation (low mono content) even at high molecular weights.

Any DMC catalyst known in the art is suitable for use in the process. These well-known catalysts are the reaction products of a water-soluble metal salt (e.g., zinc chloride) and a water-soluble metal cyanide salt (e.g., potassium hexacyanocobaltate). Preparation of suitable DMC catalysts is described in many references, including, for example, U.S. Pat. Nos. 5,158,922; 4,477,589; 3,427,334; 3,941,849; 5,470,813 and 5,482,908, the teachings of which are incorporated herein by reference. Preferred DMC catalysts are zinc hexacyanocobaltates.

The DMC catalyst usually includes an organic complexing agent to increase activity. High activity allows the catalysts to be used at very low concentrations, preferably at concentrations low enough to overcome any need to remove the catalyst from the finished polyether polyol products.

Preferred complexing agents are water-soluble heteroatom-containing organic compounds that can complex with the DMC compound. Particularly preferred complexing agents are water-soluble aliphatic alcohols. Tert-butyl alcohol is most preferred. The DMC catalyst may include, in addition to the organic complexing agent, a polyether, as is described in U.S. Pat. No. 5,482,908.

The hydroxy functional starter or hydroxyl initiator compound may be selected from a vast number and broad variety of mono- and poly-hydroxy compounds. Usually, the residue of the hydroxyl initiator compound constitutes at least 0.1 weight percent of the polyether, preferably 0.2 weight percent, most preferably 0.5 weight percent. The monohydroxy initiators include low molecular weight organic alcohols and polymeric alcohols which may be linear or branched chain, aliphatic, alicyclic, or aromatic. The monohydroxy initiators preferably are selected from alkanols containing up to about 20 carbon atoms. When an alcohol is used as the initiator, the polyether polymeric product obtained has a primary hydroxyl group on one end of the polymer chain and thus is a polymeric alcohol. The other end of the polymer chain is terminated with the residue of the alcohol initiator. Although secondary or tertiary alcohols may be used, primary alcohols are preferred. Some typically useful alcohol initiators include methanol, ethanol, n-butanol, iso-butanol, 2-ethylhexanol, n-decanol, stearyl alcohol, cetyl alcohol, allyl alcohol, benzyl alcohol, and phenol.

The poly-hydroxyl initiators contain 2 or more hydroxyl groups and may be monomeric or polymeric compounds. Examples of the poly-hydroxyl initiators include ethylene glycol, 1,2-propanediol, 1,3-propanediol, 1,2-butanediol, 1,4-butanediol, 1,6-hexanediol, 1,4-cyclohexanediol, 1,4-cyclohexanedimethanol, 2,2-dimethyl-1,3-propanediol, 2,2,4-trimethyl-1,3-pentanediol, 2,2,4,4-tetramethyl-1,3-cyclobutanediol, 2-butene-1,4-diol, 1-butene-3,4-diol, hydroquinone, resorcinol, bisphenol A, glycerol, trimethylolpropane, starch, sucrose, glucose, pentaerythritol, polyethylene glycol, polypropylene glycol, polybutylene glycol, poly(tetramethylene ether) glycol, and hydroxyl-terminated, low molecular weight polyesters. When a poly-hydroxyl compound is used as the initiator, the polyether polymer typically grows from at least 2 of the hydroxyl groups of the initiator and the subsequently-obtained polymer is a poly-hydroxyl polymer. The diols having 2 to 6 carbon atoms constitute the preferred low molecular initiators.

Polyols made by the process of the invention are usually clearer than polyols made with conventional catalysts. They are also less colored than polymers made by Pd(0) catalysis. Another important advantage is the low polydispersibility and the average molecular weights that can reach Mn of 8000.

The polymerization of EpB by DMC catalysis offers many advantages with respect to product quality and versatility. In nearly all cases colorless, low viscosity polyether polyols were obtained with the correct OH-number and narrow molecular weight distributions. Also, this method facilitated copolymerization of EpB with for example PO and BO.

Different starters have been tried and continuously added to the catalyst together with the EpB. The results were particularly good when the concentration of starter was low (which could be realized for example by a $M_n$ of 1,500 and higher). Some starters showed poor solubility in the epoxide monomers. Therefore, attempts were undertaken to add the starter all at once. While the more hydrophilic starters did not work too good or gave long induction periods the more hydophobic candidates gave short induction periods and quite good results. A probable reason is that these starters do not form stable complexes with the DMC catalyst. Examples for hydrophobic starters that worked also in higher concentrations and are therefore one preferred embodiment of the process are 1,4-cyclohexanediol, 2,5-hexanediol, 2-methyl-2,4-pentanediol, 2,4-pentanediol, 2,4-dimethyl-2,4-pentanediol.

One especially preferred embodiment of the invention comprises the addition of small amounts of orthoesters, especially trimethyl orthobenzoate to the reaction mixture in general, especially to the monomer. The resulting homopolymers had consistently good optical properties and low polydispersities ($M_w/M_n$=1.1–1.2). Usually, 1 g of trimethyl orthobenzoate was enough for 600 to 650 g of monomer.

Usually the primary reactant, 3,4-epoxy-1-butene is added to a mixture of the catalyst or catalysts, a hydroxyl initiator compound, and, optionally, a solvent. The 3,4-epoxy-1-butene monomer may be preferably added slowly or in stepwise increments to a mixture of the catalyst and the initiator. Slow addition of 3,4-epoxy-1-butene is preferred for controlling the conversion, controlling the product molecular weight, and minimizing side reaction. Stepwise addition of the 3,4-epoxy-1-butene monomer gives stepwise increase in polymer molecular weight. Thus, molecular weight control is achieved by the stoichiometry of monomer to initiator. A wide variety of molecular weights may be achieved, but the molecular weights are generally controlled to provide polymers with molecular weights of about 500 to 3000 for use as condensation polymer intermediates. The process can be carried out in a batch, semi-continuous, or continuous mode of operation.

In a typical batch process for making polyols using a DMC catalyst, all of the polyol starter can be charged initially to the reactor. In a preferred embodiment of the invention the polyol starter and DMC catalyst are charged to a reactor and heated with a small amount of epoxide, the catalyst becomes active, and the remaining epoxide is added continuously to the reactor to complete the polymerization.

One preferred embodiment of the invention the process is the continuous process as described in U.S. Pat. No. 5,777,177 to Pazos. Double metal cyanide-catalyzed polyols are made by an improved process in which a starter is continuously added during polymerization of the epoxide. The process includes a continuously added starter (Sc), and optionally, an initially charged starter (Si). The continuously added starter comprises at least about 2 equivalent percent of the total starter used. The process enables the use of water and low molecular weight polyol starters in DMC-catalyzed polyol synthesis. In addition, the process gives polyether polyols having reduced levels of high molecular weight polyol tail, which can adversely affect polyurethane foam processing.

The process of the invention may be performed in the presence of an inert solvent. Preferred inert solvents are aliphatic and aromatic hydrocarbons (e.g., toluene, hexanes) and ethers (e.g., tetrahydrofuran). It is often desirable to prepare an initial batch of polyol using an inert solvent, particularly when the starter contains primarily a continuously added starter.

The process can also be performed without solvent. In one embodiment the process is performed in high-pressure equipment, for example an autoclave. This is especially preferred when lower molecular weight epoxides are used as comonomers.

Polyoxyalkylene polyols have a wide variety of industrial uses. Monofunctional polyoxyalkylene polyethers have applications as surface active agents, reactive plasticizers, and the like. Di- and polyfunctional polyoxyalkylene polyethers (polyether polyols) may be used to prepare polyesters by reaction with dicarboxylic acids or their derivatives, and particularly, a wide variety of polyurethane polymers by reaction with an organic di- or polyisocyanate.

The polyols can be used in polyurethane coatings, elastomers, sealants, foams, and adhesives.

The resulting EpB polymers have a variety of properties. For example a difunctional poly(epoxybutene) homopolymer with a number average molecular weight of 3,500 showed a glass transition temperature of –50° C. (DSC) and heat stability (TGA) up to 300° C. The surface tension of ~25 dynes/cm was quit low.

The resulting EpB polymers also have the unique feature that they only show pendant unsaturation (that is one remaining unsaturation in 3,4 position per EpB monomer unit) on an NMR sensitivity level. The molar percentage of double bonds in 3,4 position based (pendant double bonds) on the amount of EpB monomer is higher than 95%, preferably higher than 98% and most preferably substantially 100%.

One of the main characteristics of EpB homopolymers is their tendency to cross-link under the action of oxygen and heat. If an EpB homopolymer is stored without an antioxidant a tough film develops on the liquid surface after a few months. The homopolymer underneath still looks unchanged. The EpB homopolymer was mixed with a conventional cobalt catalyst and applied to a glass plate where it cured in less than two hours. The material also cures under heat. Spreading it on a glass plate and heating it at 150° C. results into the formation of a colorless coat in less than 30 minutes.

With the concentration of the double bonds in the polyether polyol going down also the tendency to cross-link decreases. For copolymers with less than 20% EpB, we did not observe any tendency to cross-link. In any case, it is possible to prevent the cross-linking by adding an antioxidizing additive.

It is also possible to add other additives known in the art.

The versatility of the double bond from EpB-containing polyether polyols was also exploited through a number of functionalization reactions. Facile hydrosilylation was demonstrated by the attachment of heptamethyl trisiloxane chains to the polyether backbone. Hydrogenation of the epoxybutene homopolymers was also demonstrated using both palladium on carbon and Raney nickel catalysts. The result was a statistical copolymer of butylene oxide and tetramethylethylene glycol, representing the only known method to obtain such materials.

The invention is further illustrated but is not intended to be limited by the following examples in which all parts and percentages are by weight unless otherwise specified.

EXAMPLES

If not otherwise mentioned in the experimental section a continuous addition of starter technology has been applied to make the polymers. In a typical set-up 30–50 mg of catalyst were dissolved in 5 ml of toluene prior to the continuous addition of 650 g of starter/monomer solution.

Example 1

Cyclohexane-1,4-diol as a More Hydrophobic Low Molecular Weight Starter

To a 500 ml flask was added 12 g cyclohexane-1,4-diol, 4 mg DMC catalyst described in example 3 of U.S. Pat. No. 5,482,908 and 35 ml of toluene. Then 0.5 g of EpB was added and the well-stirred mixture was warmed up to 50° C. for 30 minutes. The reaction mixture was then cooled down and left over night at room temperature. The next day the oil bath temperature was increased to 100° C. and 180 g EpB was added dropwise via syringe pump.

$M_n$=2156, Polydispersity $M_w/M_n$=1.14.

Example 2

High Molecular Weight Starter Prepared From Propylene Oxide on Propylene Glycol (Mn~1000)

To a 1 L flask was added 300 g high molecular weight starter prepared from propylene oxide on propylene glycol (Mn~1000). The flask was warmed up to 105° C. by the aid of an oil bath. After 1 hour vigorous stirring, 40 mg of the DMC catalyst described in WO 01/34297 was put into the warm multranol 9109. The mixture was stirred well and 100 g EpB added dropwise and temperature controlled (lower limit=105° C., upper limit=155° C.) via a syringe pump.

Mn=1640 g/mol, Mw/Mn=1.14, OH-NUMBER=64

Example 3

Copolymerization of EpB and BO

To a 1 L flask was added 50 mg of a solid DMC catalyst described in example 3 of U.S. Pat. No. 5,482,908 and 5 ml toluene. The mixture was heated at 120° C. A solution of 28.5 g (0.32 mol) 3,4-dihydroxy-1-butene (starter), 300 g EpB, 300 g BO and 1 ml of trimethyl orthobenzoate was added by a reaction temperature controlled syringe pump (lower limit: 105° C.; upper limit 155° C.). An exothermic reaction was observed a few minutes after the addition has been started. Immediately after the reaction temperature went up to around 150° C. and stayed there while the monomer mixture was added. A slightly yellow, low viscosity material was obtained.

$M_n$=2387 g/mol, Polydispersity $M_w/M_n$=1.15

Example 4

Homopolymerization of EpB in the Presence of Trimethyl Orthobenzoate

To a 1 L flask was added 50 mg of a solid DMC catalyst described in example 3 of U.S. Pat. No. 5,482,908 and 5 ml toluene. The flask was heated at 120° C. before a solution of 37 g (0.42 mol) 3,4-dihydroxy-1-butene (starter), 600 g EpB and 1 ml of trimethyl orthobenzoate was added by a reaction temperature controlled syringe pump (lower limit: 105° C.; upper: 155° C.). The reaction temperature increased to approximately 150° C. shortly after the addition had been started and stayed there until the end of the addition. A slightly yellow, low viscosity material was obtained.

$M_n$=2074 g/mol, Polydispersity $M_w/M_n$=1.15

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a polymer comprising the step of polymerizing a component
   I. comprising 3,4-epoxy-1-butene in the presence of
   II. a catalyst consisting essentially of a double metal cyanide (DMC) catalyst and optionally a complexing agent
   III. a hydroxy-functional starter, and optionally
   IV. an orthoester.

2. The process of claim 1, wherein component I further comprises an epoxide.

3. The process of claim 2 wherein the epoxide is selected from the group consisting of ethylene oxide, propylene oxide, butylene oxide and mixtures thereof.

4. The process of claim 2 wherein the epoxide is selected from the group consisting of propylene oxide, butylene oxide and mixtures thereof.

5. The process of claim 1 wherein the DMC catalyst is a zinc hexacyanocobaltate catalyst.

6. The process of claim 5 wherein the DMC catalyst is a zinc hexacyanocobaltate/tert-butyl alcohol complex.

7. The process of claim 1 wherein the DMC catalyst is added at the beginning of the process and in several portions during the process.

8. The process of claim 1 wherein hydroxy functional starter is a low molecular weight polyol selected from the group consisting of glycerin, trimethylolpropane, propylene glycol, dipropylene glycol, and tripropylene glycol.

9. The process of claim 1 wherein hydroxy functional starter is a high molecular weight polyol.

10. The process of claim 1 wherein component IV comprises trimethyl orthobenzoate.

11. The process of claim 1 further comprising the step of obtaining a polymer and funtionalizing the polymer in a subsequent reaction.

12. The process of claim 11 wherein the subsequent reaction is hydrosilylation or hydrogenation.

* * * * *